(12) United States Patent
Günther et al.

(10) Patent No.: US 12,024,106 B2
(45) Date of Patent: Jul. 2, 2024

(54) BUMPER CROSSMEMBER FOR A VEHICLE

(71) Applicant: Kirchhoff Automotive Deutschland GmbH, Attendorn (DE)

(72) Inventors: Alexander Günther, Olpe (DE); Lena Kremer, Finnentrop (DE)

(73) Assignee: Kirchhoff Automotive Deutschland GmbH, Attendorn (DE)

( * ) Notice: Subject to any disclaimer, the term of this patent is extended or adjusted under 35 U.S.C. 154(b) by 406 days.

(21) Appl. No.: 17/621,806

(22) PCT Filed: Jul. 24, 2020

(86) PCT No.: PCT/EP2020/071056
§ 371 (c)(1),
(2) Date: Dec. 22, 2021

(87) PCT Pub. No.: WO2021/018804
PCT Pub. Date: Feb. 4, 2021

(65) Prior Publication Data
US 2022/0258684 A1 Aug. 18, 2022

(30) Foreign Application Priority Data
Jul. 26, 2019 (DE) .................... 10 2019 120 327.9

(51) Int. Cl.
*B60R 19/12* (2006.01)
*B60R 19/18* (2006.01)
(Continued)

(52) U.S. Cl.
CPC .............. *B60R 19/12* (2013.01); *B60R 19/18* (2013.01); *B60R 19/34* (2013.01); *B60R 2019/182* (2013.01); *B62D 21/152* (2013.01)

(58) Field of Classification Search
CPC ......... B60R 19/12; B60R 19/18; B60R 19/34; B60R 19/52; B60R 2019/182;
(Continued)

(56) References Cited
U.S. PATENT DOCUMENTS 8,950,794 B2   2/2015   Lenkenhoff
9,446,799 B2   9/2016   Franzpötter
(Continued)

FOREIGN PATENT DOCUMENTS

DE         19715874 A1    10/1998
DE      112006001913 T5     6/2008
(Continued)

OTHER PUBLICATIONS

DE102017124560A1 computer translation (Year: 2019).*
(Continued)

*Primary Examiner* — Amy R Weisberg
*Assistant Examiner* — Melissa Ann Bonifazi
(74) *Attorney, Agent, or Firm* — Polson Intellectual Property Law P.C.; Margaret Polson; Christopher Sylvain

(57) ABSTRACT

A bumper crossmember for a vehicle having a first crossmember provided by an outer shell facing away from the vehicle and an inner shell facing toward the vehicle, which two shells are connected to one another along their circumference. This crossmember has at least one passage oriented in the direction of its longitudinal extension and extending over its middle with respect to its longitudinal extension (y direction), and by which the crossmember is divided into an upper hollow chamber section and a lower hollow chamber section. Crash boxes arranged at distance from one another are connected to the lower hollow chamber section on its side facing the vehicle. The bumper crossmember has a second lower crossmember spaced apart in the z direction from the lower hollow chamber section and connected by at (Continued)

least two connector parts to the lower hollow chamber section of the first crossmember. Crash boxes arranged at a distance to one another are connected on the side of the second crossmember facing the vehicle.

20 Claims, 6 Drawing Sheets

(51) Int. Cl.
  *B60R 19/34*   (2006.01)
  *B62D 21/15*   (2006.01)
(58) Field of Classification Search
  CPC ...... B60R 2019/247; B60R 2019/1806; B60R 19/04; B62D 21/152; B62D 25/08; B62D 21/155; B60Y 2306/01
  USPC ....... 293/102, 121, 143, 144, 155, 146, 133, 293/132, 154; 296/193.09, 193.1, 187.04, 296/203.02
  See application file for complete search history.

(56) References Cited

U.S. PATENT DOCUMENTS

| | | | |
|---|---|---|---|
| 9,598,100 | B2 | 3/2017 | Lenkenhoff |
| 9,764,764 | B2 | 9/2017 | Irle |
| 10,005,495 | B2 | 6/2018 | Töller |
| 10,577,025 | B2 | 3/2020 | Michler |
| 10,882,559 | B2 | 1/2021 | Gündogan |
| 2005/0067860 | A1* | 3/2005 | Makita ................... B60R 19/34 296/203.02 |
| 2011/0121586 | A1 | 5/2011 | Gonin |
| 2019/0344385 | A1 | 11/2019 | Töller |
| 2020/0231107 | A1 | 7/2020 | Günther |
| 2020/0254948 | A1 | 8/2020 | Töller |
| 2020/0317149 | A1 | 10/2020 | Höning |
| 2020/0398895 | A1 | 12/2020 | Günther |
| 2021/0024133 | A1* | 1/2021 | Kim ..................... B62D 25/085 |
| 2021/0221311 | A1 | 7/2021 | Weige |
| 2022/0009435 | A1 | 1/2022 | Günther |

FOREIGN PATENT DOCUMENTS

| | | | |
|---|---|---|---|
| DE | 102017118514 B3 | 1/2019 | |
| DE | 102017124590 A1 * | 4/2019 | |
| EP | 0839690 A2 | 5/1998 | |
| EP | 2325057 A1 | 5/2011 | |
| JP | 2005162188 A | 6/2005 | |
| JP | 2006256518 A | 9/2006 | |
| WO | WO-2024008761 A1 * | 1/2024 | ........... B21D 35/006 |
| WO | WO-2024028099 A1 * | 2/2024 | ............ B60R 19/12 |

OTHER PUBLICATIONS

WO2024008761A1 computer translation (Year: 2024).*
WO2021028099A1 computer translation (Year: 2024).*
Examination report dated Jan. 31, 2023 in related Japanese application 2022-503911.
Examination report dated Oct. 18, 2023 in related Korea application 10-2022-7006687.
International Search Report (ISR) of the International Searching Authority (ISA) mailed Sep. 14, 2020 in parent international application PCT/EP2020/071056.
Written Opinion (WO) of the International Searching Authority (ISA) mailed Sep. 14, 2020 in parent international application PCT/EP2020/071056.
U.S. Appl. No. 17/425,864, filed Oct. 19, 2021 by Kirchhoff Automotive Deutschland GmbH.

* cited by examiner

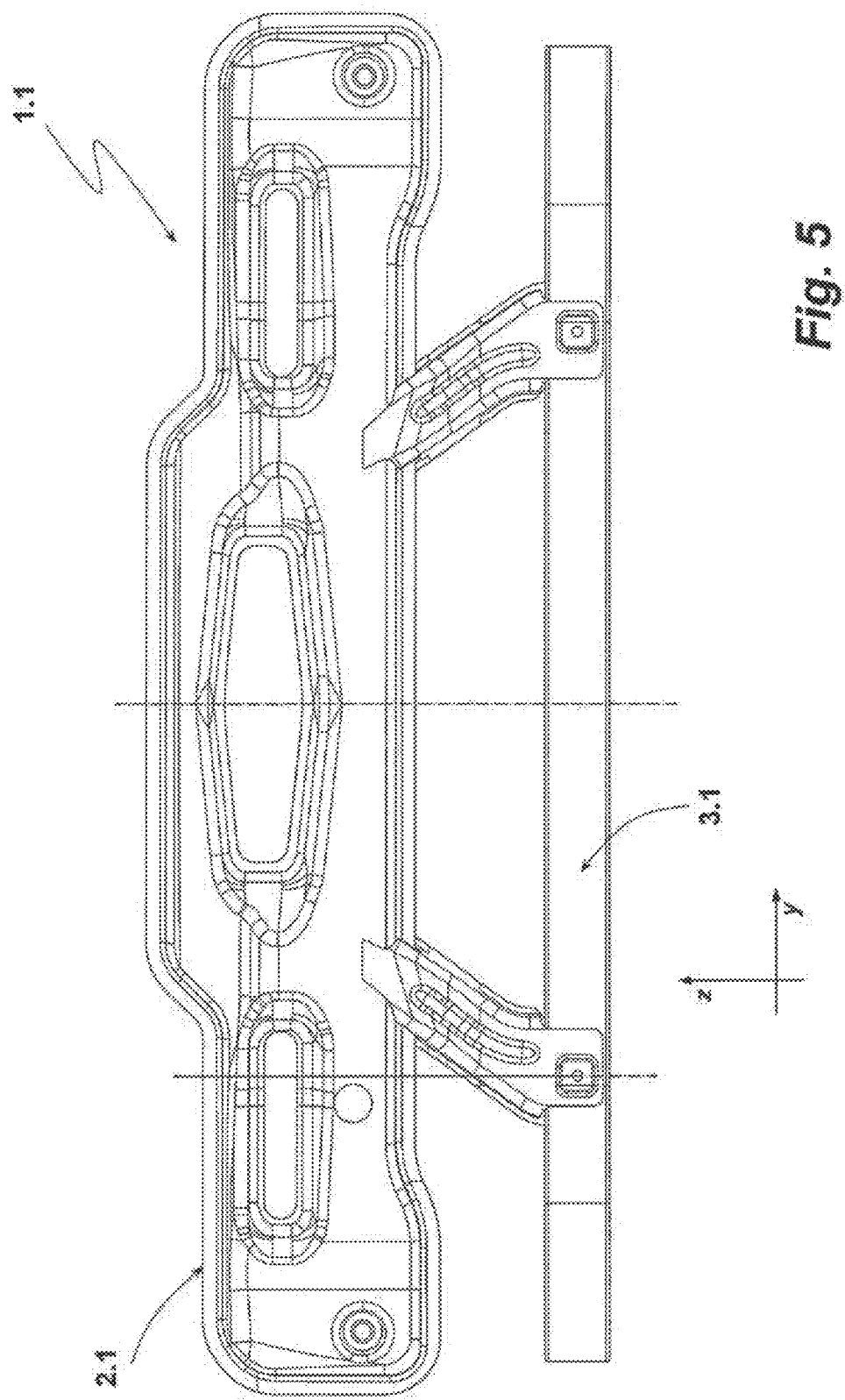

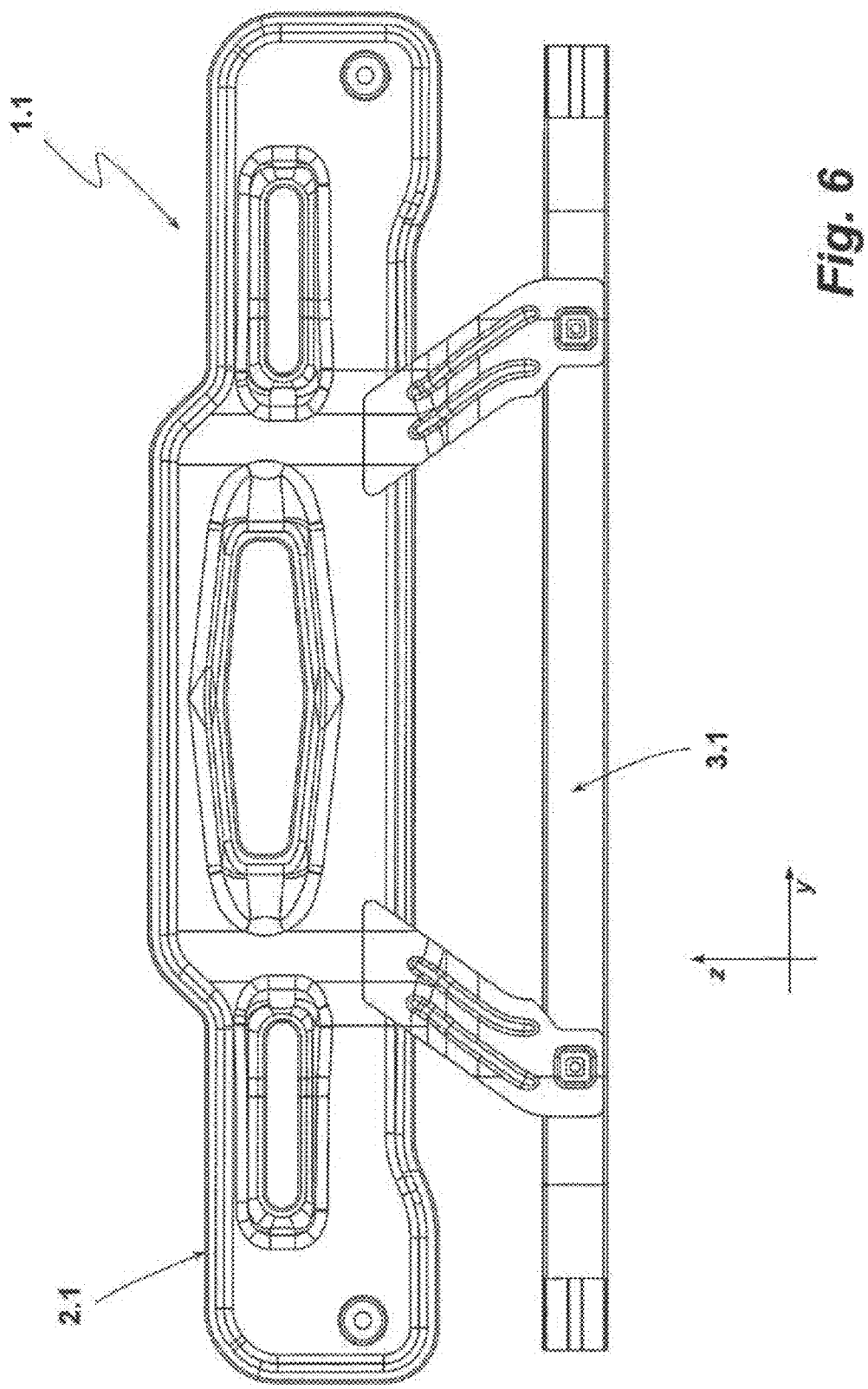

BUMPER CROSSMEMBER FOR A VEHICLE

BACKGROUND

The present disclosure relates to a bumper crossmember for a vehicle, which bumper crossmember has a crossmember provided by an outer shell facing away from the vehicle and an inner shell facing toward the vehicle, which two shells are connected to one another along their circumference, which crossmember has at least one passage which is oriented in the direction of its longitudinal extension, extends over its center with respect to its longitudinal extension, and is divided by the crossmember into an upper hollow chamber section and a lower hollow chamber section, and crash boxes arranged at a distance to one another are connected to its lower hollow chamber section on its side facing toward the vehicle.

To protect the safety cell of a vehicle and assemblies located in front of it, such as the engine, the radiator, and the like, motor vehicles are equipped with a bumper arrangement in the region of the front section. Such a bumper arrangement comprises a bumper crossmember, which extends over the width of the vehicle and is connected to longitudinal beam components of the vehicle. These longitudinal beam components can be so-called crash boxes, which, if a specific impact energy is exceeded, absorb this energy by plastic deformation. Such a bumper crossmember is typically clad toward the vehicle outside by a cladding shell made of plastic. The intermediate space between the cladding shell made of plastic and the crossmember made of metal is typically filled with a foam.

The connection of such a bumper crossmember to the longitudinal beams arranged in the lateral regions of a vehicle forms a main load path for the absorption of kinetic energy in case of an impact. Efforts to design vehicles in a collision-compatible manner have the result that impact energy has to be absorbed over a greater vertical extension (z vehicle direction) and a greater horizontal extension (y direction). The greater vertical and horizontal extension of such bumper crossmembers is supposed to improve the collision compatibility between different vehicles. For this purpose, crash management systems have been developed which, in addition to a main load path, have one or two secondary load paths spaced apart in the vertical direction therefrom. Energy is also absorbed via these secondary load paths, depending on the design in a plane above and/or below the main load path. To meet the requirement for better collision compatibility between different vehicles, a separate bumper crossmember can be assigned to each load path. These are arranged at a distance to one another. Such a design of a collision-compatible bumper crossmember or such an arrangement is required in those vehicles in which a single bumper crossmember cannot extend over the entire height to be bridged for the incident airflow, for example, radiators in the front section.

A bumper crossmember of the type mentioned at the outset is known from DE 10 2017 118 514 B3. This bumper crossmember has a crossmember which is formed from an outer shell facing away from the vehicle and an inner shell facing toward the vehicle. The two shells are connected to one another along their circumference, specifically by a laser weld. Multiple passages are introduced in the crossmember following the longitudinal extension of the crossmember. One of the passages is located in the middle region of the crossmember with respect to its y direction. The height of the crossmember (z direction) is divided into three sections by the passages, specifically into an upper hollow chamber section, a lower hollow chamber section, and a passage section located in between.

Although this previously known bumper crossmember already meets high demands, it would be desirable if the crash performance could be improved. The crash performance is tested, among other things, using the MPDB crash test, which crash test is a compatibility crash test (MPDB—mobile progressive deformable barrier).

DE 11 2006 001 913 T5 discloses a collision protection system. This comprises an upper and a lower impact-absorbing component, which extend in the transverse direction of the vehicle, wherein these components are mutually integrated by a connecting means. The impact-absorbing components are bumper crossmembers. The connecting means are designed as crash boxes and extend in their height, which corresponds to the z extension of the arrangement, formed by the two crossmembers. The connecting means formed as crash boxes are located on the side of each member facing toward the vehicle. Due to the use of two bumper crossmembers, a larger impact area is provided in the z direction, which is expedient for the purposes of a compatibility crash test. The MPDB crash test was not yet known at the point in time of this prior art.

SUMMARY

Against this background, an aspect of the present disclosure is improving a bumper crossmember according to DE 10 2017 118 514 B3 with respect to its crash performance in compatibility crash tests, for example the MPDB crash test.

This is achieved according to the present disclosure by a generic bumper crossmember of the type mentioned at the outset, wherein the bumper crossmember further comprises a second lower crossmember spaced apart in the z direction from the lower hollow chamber section of the upper crossmember, wherein the second crossmember is connected to the lower hollow chamber section of the upper crossmember by at least two connector parts, and lower crash boxes arranged at a distance from one another are connected on a side of the lower crossmember facing the vehicle.

The directions used in the context of these statements—the x direction, the y direction, and the z direction—are the coordinate directions of a vehicle, wherein the x direction is the longitudinal extension, the y direction is the extension in the lateral direction, and the z direction is the vertical extension (vertical axis) of the vehicle. This coordinate system is applied to the description of the bumper crossmember in the same way.

The term "passage" used in the context of these statements comprises all openings introduced into the bumper crossmember, of whatever type, which penetrate the bumper crossmember in the direction of travel and thus in the x direction. These can be, for example, openings having a circumferential wall extending into the bumper crossmember. There is also the possibility that the two shells have openings aligned with one another without a formed collar or a formed wall, which openings are introduced, for example, by laser, milling, or the like into the respective shell.

In this bumper crossmember, crash boxes are connected to the side of the lower hollow chamber section facing toward the vehicle. Therefore, the upper hollow chamber section of the upper crossmember is above the plane of the crash boxes in the vertical direction (z direction). The main load path is thus defined by the lower hollow chamber section of the upper crossmember. Due to the shell concept of the upper crossmember, impact forces acting on the upper crossmember section are introduced via the crossmember into the crash boxes arranged on the lower hollow chamber section. This thus represents a further load path. In addition to these two load paths, the bumper crossmember has a third load path through its lower crossmember. The lower crossmember is used to enlarge the total height of the bumper crossmember and thus also as a pedestrian safeguard. The lower crossmember is arranged in the vertical direction at a distance to the lower terminus of the lower hollow chamber section of the upper crossmember and is connected thereto by at least two connector parts. Impact energy acting on the lower crossmember is introduced via the two connector parts into the lower hollow chamber section of the upper crossmember. This represents a third load path.

Crash boxes are also connected to the side of the lower crossmember facing toward the vehicle. While the crash boxes connected to the lower hollow chamber section of the upper crossmember are typically connected to the longitudinal beam of a vehicle, the crash boxes connected to the lower crossmember are typically supported on the vehicle side, for example, on the axle supports. The third load path is provided in such an embodiment by the lower crossmember and the crash boxes connected thereto.

The connector parts are separate components which are connected to the lower hollow chamber section of the upper crossmember and the lower crossmember. Such a modular design of the bumper crossmember permits different overall heights of a bumper crossmember to be able to be implemented by solely using different connector parts with the same upper crossmember and with the same lower crossmember. Only the connector parts being adapted to the different overall height of the bumper crossmember are required to implement such a modular bumper crossmember concept.

With such a bumper crossmember which is significantly taller with respect to its height (z direction) in comparison to those previously known, the requirements for a compatibility crash test, in particular the MPDB crash test, are met. This is achieved by a large-area energy distribution or energy dissipation due to the greater height and width of the bumper crossmember and thus its larger front surface.

Due to the height of the bumper crossmember, the upper crossmember has at least one passage. This is also used to conduct through air, for example, to cool assemblies located behind it, such as a radiator or the like. This at least one passage extends over the middle of the bumper crossmember in relation to its longitudinal extension (y direction). In addition to the above-described air passage function, this passage can also be used to form an intended bending point in the middle of the upper crossmember in the direction of its longitudinal extension. It has surprisingly been shown that the provision of an intended bending point provided in the middle of the upper crossmember of such a bumper crossmember improves the deformation behavior of the bumper crossmember in a compatibility crash test with an overlap of, for example, 800 mm, as is the case in compatibility crash tests that are presently carried out, in particular to be able to introduce impact energy into the lateral rocker panels of the vehicle. With respect to its width, the bumper crossmember is designed so that in the event of a strain corresponding to such a compatibility crash test, the end section of the bumper crossmember, on which the barrier acts, is guided to the wheel and the impact energy is introduced via the wheel into the lateral rocker panels arranged on this side. Such a deformation behavior is assisted by the provision of an intended bending point in the region of the middle of the longitudinal extension of the bumper crossmember or at least its upper crossmember. The introduction of crash energy to be absorbed not only into the crash boxes and the longitudinal beams, but also into the lateral rocker panels promotes the safety of the persons in the passenger compartment. Such a crash deformation behavior is also advantageous for keeping impact energy away from the battery modules typically arranged in the bottom region in an electric vehicle. Such an intended bending point can thus be configured in principle via the contouring of the passage without additional measures, for example, in that due to the circumferential contour of the passage, the height of the upper hollow chamber section and that of the lower hollow chamber section decreases toward the intended bending point. Such a passage has the greatest inside clearance in the region of its middle, which decreases toward its lateral ends located in the y direction. Such an intended bending point may also be achieved in another way, for example, by providing beads extending from the longitudinal extension of the two hollow chamber sections of the upper crossmember, which are interrupted in the region of the middle of the upper crossmember. The use of plates reduced with respect to their material thickness in the region of the middle of the upper crossmember to form at least one of the two shells can also be performed for this purpose. A combination of different measures to achieve an intended breaking point in the middle or in the middle region of the upper crossmember is also possible. A reduced material thickness in the region of the middle of the shells can be performed, for example, by using so-called tailored rolled blanks or tailored welded blanks. Such an intended bending point can also be effectuated by using reinforcing plates on the inside of at least one of the two shells with an interruption between them in the region of the intended breaking point.

According to one preferred embodiment, the distance of the crash boxes connected to the lower hollow chamber section of the upper crossmember from one another is greater than the distance of the crash boxes connected to the lower crossmember. These crash boxes, as is typical, are arranged symmetrically to the middle of the bumper crossmember in the y direction. In such an embodiment, it has proven to be advantageous if the at least two connector parts for connecting the lower crossmember to the lower hollow chamber section of the upper crossmember are connected on the outside with respect to the y direction to the crash boxes of the lower crossmember on the lower crossmember and on the inside with respect to the crash boxes of the upper crossmember on the lower hollow chamber section. Due to the geometry for connecting the crash boxes, which is often predefined by the vehicle, in such a design the connector parts are inclined or have a substantially S-shaped profile in a frontal view. An embodiment is advantageous in which the connection of these connector parts to the upper crossmember takes place in a section in which no passage is present in the z direction above the connector part connection. A planar force transfer from the upper crossmember, specifically all of its sections, into the connector parts and then into the lower crossmember and vice versa is ensured in this way. This assists the above-mentioned large-area energy distribution of impact energy, in particular if only a part of the front area of the bumper crossmember is affected by an impact.

Such an inclined or substantially S-shaped design of the connector parts also contributes to reinforcing them in the event of torsional strains.

These two connector parts are embodied as connector parts each formed by two shells. The two shells can be provided having the same material or also different materials. These two shells are connected to one another in their middle section, typically by means of a welded connection. According to one embodiment, such a connector part has a first connector shell having a U-shaped middle section and having two connection sections each extending toward the front side of a crossmember. The second connector shell is used for closing the U-shaped middle section in order to form a closed box profile in this section. The second connector shell is additionally used to complete the connection sections of the first connector shell to form receptacles closed in the x direction. The upper receptacle is used to insert a lower section of the lower hollow chamber section of the upper crossmember. The lower receptacle is used to insert at least one section of the lower crossmember with respect to its height. These receptacles are therefore also U-shaped. The two legs of such a receptacle can be connected to the front side or rear side of the respective received crossmember. This promotes a force transfer from such a connector part into the adjoining crossmember and vice versa. In another embodiment, it is provided that only the connection section of the connector shell facing away from the vehicle is connected to the shell of the upper crossmember facing away from the vehicle, typically using a welded connection. The connection section of the connector shell facing toward the vehicle used to complete this upper crossmember receptacle is arranged with a small gap to the surface of the inner shell. The lower hollow chamber section is only guided with its outer side to this connection section in case of crash, whereby in such a case this connection section positively influences the deformation behavior of the bumper crossmember due to the higher required energy linked thereto, which is required for further deformation.

The first connector shell is seated according to one embodiment of such a connector part on the side facing away from the vehicle, while the second connector shell is arranged on the side facing toward the vehicle.

These connector parts are connected to the crossmember, for example, by a welded connection or also by a screw connection.

To reinforce such a connector part, the first and/or the second connector shell can each have at least one reinforcing bead following its longitudinal extension. Such a reinforcement acts not only in the x direction, but also reinforces such a connector part and the entire bumper crossmember in the event of torsional strains.

In one refinement of such a bumper crossmember, it is provided that the lower crossmember is also connected in the region of its end sections by two further connector parts to the lower hollow chamber section of the upper crossmember. When crash energy is to be introduced into the lateral rocker panels of the vehicle, such a measure is expedient, since a force transfer element is provided by these connector parts seated on the outside, through which the force acting on the bumper crossmember is introduced flatly into the wheel due to the vertical extension of these connector parts (extensions in the z direction) and is also introduced into the wheel when, due to the impact, a certain adjustment of the bumper crossmember in the z direction has taken place as a result of an impact. These two further connector parts are preferably located for this purpose on the rear side of the lower crossmember and the upper crossmember. These connector parts can be hollow chamber profile sections.

The two shells for forming the upper crossmember are typically press-hardened sheet steel plates, which are circumferentially connected to one another to form the upper crossmember. For this purpose, the half shells each have a circumferential joining flange, at which the two half shells adjoin one another. The two half shells are typically circumferentially welded to one another. This typically also applies for the at least one passage, so that the wall sections of the two shells forming the passage are also typically circumferentially connected to one another by welding.

The lower crossmember can be, for example, an aluminum extruded profile. The above-described connector parts connected to the end sections can also be extruded aluminum profile sections. A bumper crossmember designed in such a manner is weight-optimized in relation to a bumper crossmember which is produced exclusively from sheet steel components. A further weight optimization may be achieved if all components of the bumper crossmember are aluminum components. However, it is obvious that the invention is not restricted to this above-described material selection of the mentioned components, and that the invention is also implemented with components made of the same material and with another material selection to form the individual components.

BRIEF DESCRIPTION OF THE DRAWINGS

The following description is provided on the basis of example embodiments with reference to the appended figures, wherein:

FIG. 5 shows a front view of a further bumper crossmember according to the present disclosure, and FIG. 6 shows a rear view of the bumper crossmember of FIG. 5.

DETAILED DESCRIPTION

Figure 1:
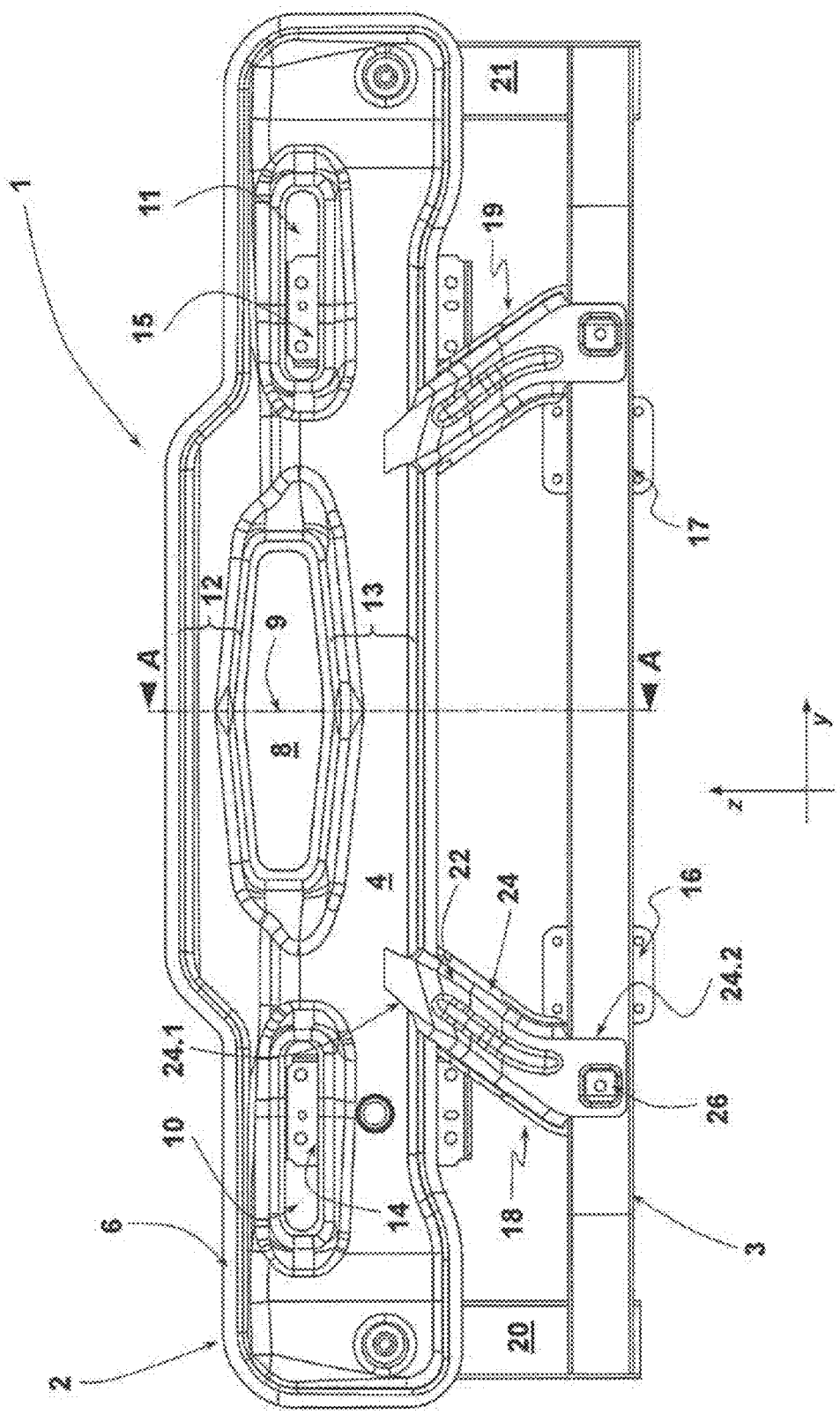
FIG. 1 shows a front view of a bumper crossmember according to the present disclosure.
Figure 2:
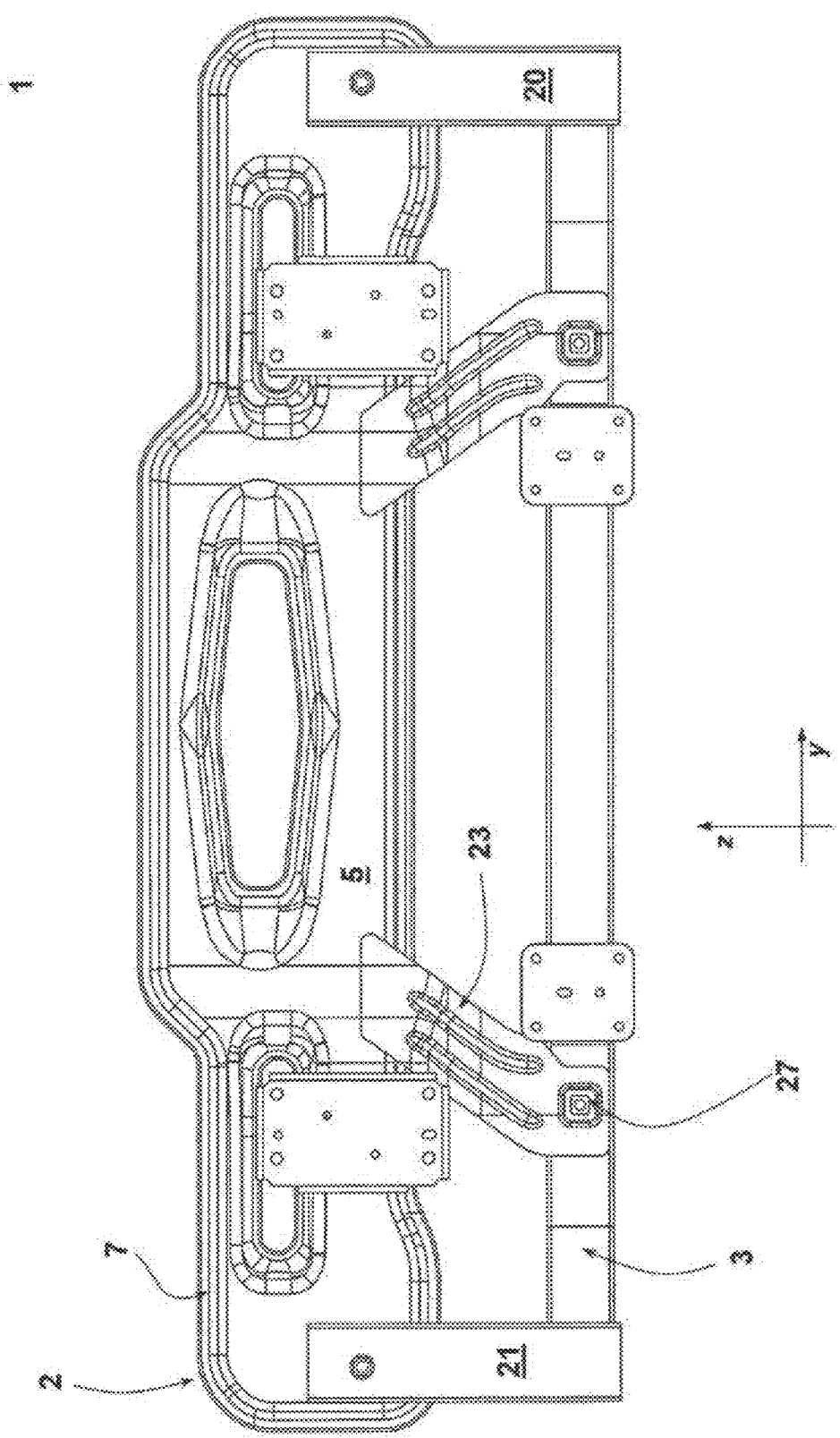
FIG. 2 shows a rear view of the bumper crossmember of FIG. 1.
Figure 3:
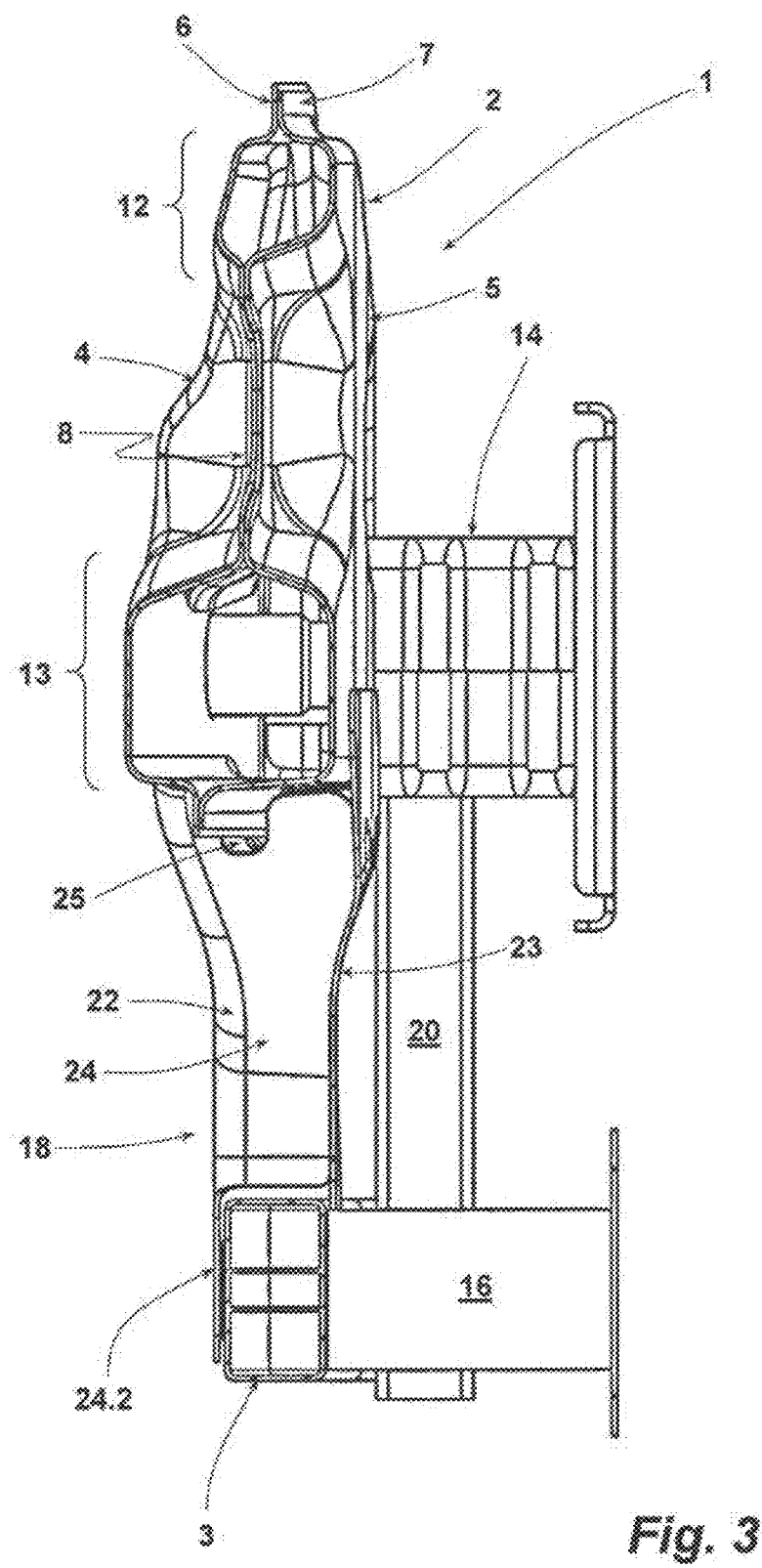
FIG. 3 shows a sectional illustration through the bumper crossmember of the above figures along line A-A of FIG. 1.

With reference to FIGS. 1-3, a bumper crossmember 1 comprises an upper crossmember 2 and a lower crossmember 3 connected thereon. The upper crossmember 2 of the illustrated example embodiment is composed of an outer shell 4 and an inner shell 5 (see FIG. 2). In the illustrated example embodiment, the two shells 4, 5 are press-hardened sheet steel components. A cavity is located between the two shells 4, 5. The two shells 4, 5 bear a circumferential joining flange 6, 7 protruding in the plane of the respective shell 4 or 5, at which the two shells 4, 5 are connected to one another by welding. Any type of welding method is suitable in principle for this purpose. In the illustrated example embodiment, the two shells 4, 5 are connected to one another by laser welding. Laser welding is used for the circumferential welding of the two shells 4, 5 at their joining flanges 6, 7, since this has particularly low distortion. The upper crossmember 2 has a first passage 8, which extends over the middle 9 of the upper crossmember 2 in the direction of its longitudinal extension (y direction). Two further passages 10, 11 are located with spacing to the passage 8 at approximately the same height as the passage 8. The passages 8, 10, 11 are arranged in a row. The upper crossmember 2 is divided by this row into an upper hollow chamber section 12 and a lower hollow chamber section 13. The section in which the passages 8, 10, 11 are arranged is located between these two hollow chamber sections 12, 13. The wall sections of the two shells 4, 5 enclosing the passages 8, 10, 11 are also circumferentially welded to one another, specifically in the illustrated example embodiment by MAG welding. This enables bridging of gaps present under certain circumstances between the edges facing toward one another of the wall sections enclosing the passages 8, 10, 11. In the illustrated example embodiment, the upper crossmember 2 has a middle section, which has a greater height (z direction) than the crossmember sections adjoining thereon toward the lateral end sections. The section of greater height of the crossmember 2 extends in the direction of the longitudinal extension of the crossmember 2 over a greater extension than the extension of the passage 8 in this regard.

Two crash boxes 14, 15 arranged at a distance to one another are connected to the rear on the lower hollow chamber section 13, of which only the respective connection plate (base plate) thereof is visible in FIGS. 1 and 2.

The passage 8 has an outline geometry like a rhomboid, since its largest inside clearance is located in the middle 9 of the upper crossmember 2. The height of the two hollow chamber sections 12, 13 thus decreases starting from the lateral terminus of the passage 8 in the direction toward the middle 9. An intended bending point is provided in this way, since the crossmember 2 is weakened with respect to an absorption of impact energy in relation to the sections adjoining thereon due to the lesser height of the hollow chamber sections 12, 13.

The lower crossmember 3 of the illustrated example embodiment is an extruded aluminum profile, which is embodied as a three-chamber hollow chamber profile. Two crash boxes 16, 17 are also connected to the lower crossmember 3, of which only the respective connection plate (base plate) is visible from the perspective of the views of the bumper crossmember 1 in FIGS. 1 and 2. The lower crossmember is connected to the upper crossmember 2 in this example embodiment using four connector parts. These connector parts are two inner connector parts 18, 19 and two outer connector parts 20, 21.

The arrangement of the crash boxes 14 to 17 on the upper crossmember 2 or the lower crossmember 3, respectively, is seen in the sectional illustration of FIG. 3. The crash box 14 is provided with its connection plate to be connected on a longitudinal beam of a vehicle. The crash box 16 is provided with its connection plate to be connected on an axle support of a vehicle.

The connector part 18 is described in more detail hereinafter with reference to FIGS. 1 to 3. The same statements apply similarly to the connector part 19. The connector part 18 is composed of two shells, specifically a first connector shell 22 and a second connector shell 23, which is used as a closing plate in this embodiment. The connector part 18, as can be seen from FIGS. 1 and 2, is connected to the respective crossmember 3 or 2 on the outside in the y direction with respect to the crash box connected to the lower crossmember 3 and is connected on the inside with respect to the crash box 14 connected to the lower hollow chamber section 13 of the upper crossmember 3. The crash box 16 has a lesser distance to the middle 9 than the crash box 14. The crash boxes 14, 16 are arranged offset to one another. For this reason, the connector part 18 is curved substantially S-shaped (see FIGS. 1 and 2) and thus extends from the section of the lower crossmember 3 directly adjacent to the connection of the cross box 16 to the upper crossmember 2 and is connected thereon in a section of the lower hollow chamber section 13 in which no passage is present in the z direction. This region is the section of the upper crossmember in which its height transitions from the middle section having greater height into the two adjoining sections of lesser height. The connector part 18 is manufactured in the illustrated example embodiment from a steel having a strength of 600 to 800 MPa. The material strength of this connector part 18 is thus between the strength of the press-hardened shells (1500 MPa) and that of the material used for the lower crossmember 3. The above material specifications relate to the specific described example embodiment. It is obvious that other materials, in particular other types of steels, can also be used, and obviously also fiber composite materials.

The first connector shell 22 has a middle, U-shaped section 24. This is the section which extends between the lower side of the upper crossmember 2 and the upper side of the lower crossmember 3. This section 24 merges into a respective tab- or lobe-like connection section 24.1, 24.2. The connection sections 24.1, 24.2 represent a boundary of a crossmember receptacle. The ends of the walls of the U-shaped section 24 facing in the z direction are adapted to the respective contour of the crossmember 2 or 3, respectively, to be connected thereon. The first connector shell 22 has a recess 25 for receiving the joining flanges 6, 7 welded to one another at its end for this purpose, which faces toward the crossmember 2. The section facing toward the opening side of the U-shaped design is designed so that it is spaced apart from the lower side of the side wall of the inner shell 5. The upper connection sections 24.1 are welded to the front side of the shell 4 facing away from the vehicle.

The contour of this U-shaped section 24 in the direction toward the wall delimiting the lower crossmember 3 is linear. In the illustrated example embodiment, this wall does not abut the upper side of the lower crossmember 3 (see FIG. 3). The second connector shell 23 is used to close the U-shaped section 24 of the first connector shell 22, in order to form a box profile in this way. At the same time, the second connector shell 23 is embodied having a length such that it extends over the rear side of the inner shell 5 of the lower hollow chamber section 13 of the upper crossmember 2 and the rear side of the lower crossmember 3. The crossmember receptacles prepared by the first connector shell 22 are thus completed, so that two crossmember receptacles open in the y direction but closed in the x direction are provided, in which, as already stated above, the crossmembers 2, 3 are inserted. These sections of the second connector shell 23 bordering the rear wall of the upper crossmember 3 are also connected by welding thereto. In this case, it is provided in this example embodiment against the background of producibility, in particular with reference to narrow tolerances that are possibly required or result, that the upwardly protruding lobe-like sections of the first connector shell 22 are led spaced apart to the inner shell 5 of the upper crossmember 2, 2.1. Moreover, it is ensured by the spacing that interfering frequency problems in the form of vibrations or rattling noises are suppressed. The crossmember receptacle for the lower crossmember 3 is embodied in the illustrated example embodiment so that the crossmember 3 is almost completely received therein with respect to its height. The lower crossmember 3 is fastened on the connector part 18 by means of a fastening bolt (not shown in the figures). The two connector shells 22, 23 have embossed recesses 26, 27 oriented into the crossmember receptacle for this purpose. The fastening bolt (not shown in the figures)

extends through the lower crossmember 3 in the middle hollow chamber seen in FIG. 3. The spacing of the two profile chambers delimiting the middle hollow chamber is selected so that it is not necessary to use sleeves to reinforce the lower crossmember 3 in conjunction with a screw connection on the lower connections of the connector parts 18, 19.

It is apparent from FIGS. 1 and 2 that the first connector shell 22 is embossed on its side facing away from the vehicle with a reinforcing bead following the S-shaped profile. The second connector shell 23 has two reinforcing beads extending parallel to one another, which also follow the longitudinal extension of the connector parts.

Figure 4:
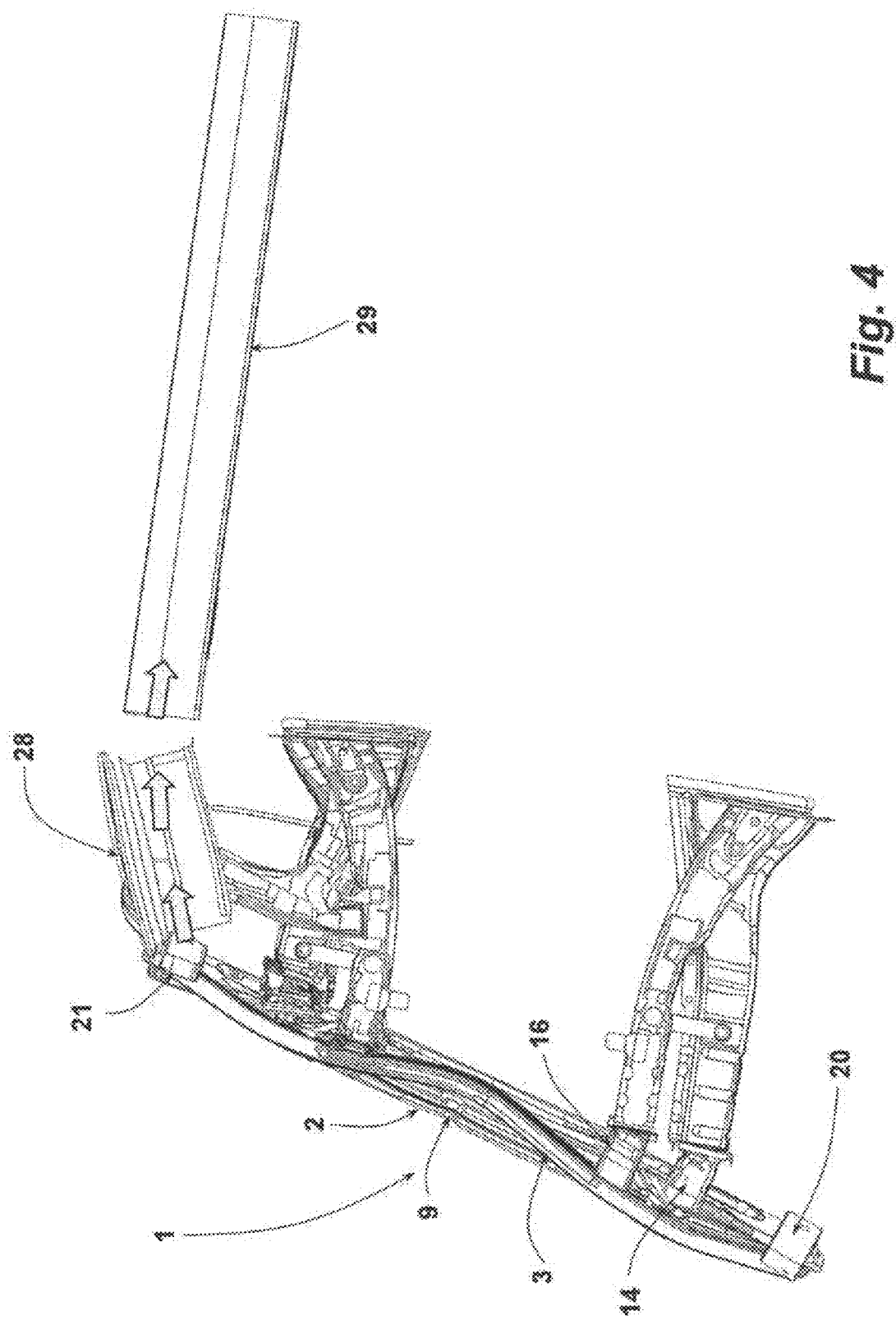
FIG. 4 shows a schematic bottom view of the bumper crossmember of the above figures installed on a vehicle after carrying out a compatibility crash test with an overlap.

FIG. 4 shows the bumper crossmember 1 after carrying out a compatibility crash test with an overlap, connected to a vehicle only shown in certain individual parts, with the viewing direction from below. The crash boxes 14 and 16, connected to the vehicle, are seen on the less deformed section of the bumper crossmember 1, which is the lower portion from the perspective of FIG. 4. Moreover, the connector part 20 is clearly apparent. The barrier acted with its overlap on the upper portion of the bumper crossmember 1 from the perspective shown in FIG. 4. It can be seen that the upper crossmember 2 buckles in the region of its middle, as does the lower crossmember 3. The crash boxes 15, 17 are pushed together due to the impact and the bumper crossmember 1 is deformed in the direction toward the vehicle wheel 28 on this side. The connector part 21 acts against the vehicle wheel 28 or its rim, which, as indicated by the block arrows, introduces the absorbed impact energy into the lateral rocker panel 29 of the vehicle. It is important that the passenger compartment has remained nearly undeformed despite the significant impact energy. This deformation behavior is also advantageous if a battery housing having battery modules adjoins the rocker panel 29 or is connected thereon. For this reason, the battery modules housed in such a battery housing also remain undamaged in the event of such an impact. At most, minor deformations can be detected on the outer profile of the battery housing.

FIGS. 5 and 6 show a further example embodiment of a bumper crossmember 1.1. This is constructed like the bumper crossmember 1 and differs from the bumper crossmember 1 only in that its lower crossmember 3.1 is not additionally connected to the upper crossmember 2.1 with connector parts arranged in the end regions.

The invention has been described on the basis of example embodiments. Without departing the scope of the claims, numerous further possibilities for implementing the invention result for a person skilled in the art, without these having to be explained in more detail in the context of this disclosure.

LIST OF REFERENCE NUMERALS

1, 1.1 bumper crossmember
2, 2.1 upper crossmember
3, 3.2 lower crossmember
4 outer shell
5 inner shell
6 joining flange
7 joining flange
8 passage
9 middle
10 passage
11 passage
12 upper hollow chamber section
13 lower hollow chamber section
14 crash box
15 crash box
16 crash box
17 crash box
18 connector part
19 connector part
20 connector part
21 connector part
22 first connector shell
23 second connector shell
24 section
24.1 connection section
24.2 connection section
25 recess
26 embossed recess
27 embossed recess
28 vehicle wheel
29 lateral rocker panel

The invention claimed is:

1. A bumper crossmember for a vehicle, comprising:
an upper crossmember provided by an outer shell facing away from the vehicle and an inner shell facing toward the vehicle, the two shells connected to one another along their circumference, wherein the upper crossmember has at least one passage which is oriented in the direction of a longitudinal extension of the upper crossmember and extends over a middle of the upper crossmember with respect to the longitudinal extension (y direction), and wherein the upper crossmember is divided into an upper hollow chamber section and a lower hollow chamber section by the at least one passage, and upper crash boxes arranged at distance from one another are connected to a side of the lower hollow chamber section facing the vehicle; and
a lower crossmember spaced apart in the z direction from the lower hollow chamber section of the upper crossmember, wherein the second crossmember is connected to the lower hollow chamber section of the upper crossmember by at least two connector parts, and lower crash boxes arranged at a distance from one another are connected on a side of the lower crossmember facing the vehicle,
wherein two connector parts of the at least two connector parts are formed by two connector shells, and the two connector parts, in the y direction, are connected to the lower crossmember on the outside in relation to the lower crash boxes and are connected to the lower hollow chamber section of the upper crossmember on the inside in relation to the upper crash boxes.

2. The bumper crossmember of claim 1, wherein the lower crash boxes connected to the lower crossmember have a lesser distance between one another than that of the upper crash boxes of the upper crossmember connected to the lower hollow chamber section.

3. The bumper crossmember of claim 1, wherein each connector part of the two connector parts has a first connector shell having a U-shaped middle section and having two connection sections extending over the front side of each respective crossmember, and a second connector shell for closing the middle section of the first connector shell and for completing the connection sections to form upper and lower receptacles closed in the x direction for insertion of a lower section of the lower hollow chamber section of the upper crossmember into the upper receptacle and for insertion of at least a part of the lower crossmember into the lower receptacle.

4. The bumper crossmember of claim 3, wherein the first connector shell is seated on the side of the bumper crossmember facing away from the vehicle.

5. The bumper crossmember of claim 3, wherein the upper connection section of the first connector shell has a recess for providing an engagement space for a joining flange protruding in the z direction from the lower hollow chamber section.

6. The bumper crossmember of claim 3, wherein the second connector shell extends over the rear side of each respective crossmember.

7. The bumper crossmember of claim 3, wherein the first connector shell and/or the second connector shell each have at least one reinforcing bead following a longitudinal extension thereof.

8. The bumper crossmember of claim 1, wherein the lower crossmember is additionally connected to the upper crossmember by two further connector parts, which further connector parts are connected to the two crossmembers in outer end sections of the two crossmembers.

9. The bumper crossmember of claim 8, wherein the further connector parts are hollow chamber profile sections, which are connected to the rear side of the two crossmembers.

10. The bumper crossmember of claim 1, wherein the bumper crossmember extends far enough outward in the y direction that in the event of a force introduction corresponding to a compatibility crash test with partial overlap, an impact-strained outer end of the bumper crossmember is guided to a vehicle wheel.

11. The bumper crossmember of claim 1, wherein the upper crossmember has multiple passages arranged in a row.

12. The bumper crossmember of claim 1, wherein, in a region of the middle of the upper crossmember in the y direction, the upper crossmember has an intended bending point.

13. The bumper crossmember of claim 12, wherein the intended bending point is provided by a taper of the upper and lower hollow chamber sections in the z direction and thus providing a corresponding enlargement in the z direction of the passage located in the region of the middle of the upper crossmember.

14. The bumper crossmember of claim 1, wherein the lower crossmember is a light metal hollow chamber profile.

15. The bumper crossmember of claim 14, wherein the lower crossmember is made of an aluminum alloy.

16. The bumper crossmember of claim 1, wherein the two shells forming the upper crossmember are press-hardened sheet steel parts.

17. The bumper crossmember of claim 16, wherein the lower crossmember is a light metal hollow chamber profile.

18. The bumper crossmember of claim 17, wherein the two connector parts of the at least two connector parts are sheet steel parts having a material strength which is between a strength of the two shells of the upper crossmember and a strength of the lower crossmember.

19. The bumper crossmember of claim 18, wherein the lower crossmember is additionally connected to the upper crossmember by two further connector parts, which further connector parts are light metal hollow chamber profile sections.

20. The bumper crossmember of claim 16, wherein the two connector parts of the at least two connector parts are sheet steel parts having a material strength which is between a strength of the two shells of the upper crossmember and a strength of the lower crossmember.

* * * * *